Figure 1:
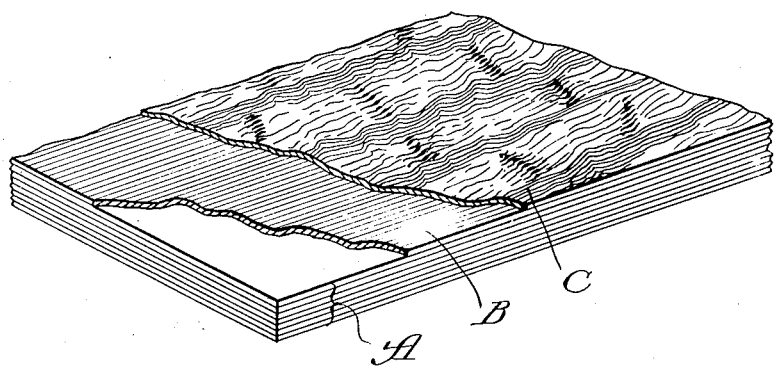

June 14, 1932.  J. D. COCHRANE, JR  1,863,239
DECORATED LAMINATED PRODUCT AND PROCESS OF MANUFACTURE Filed April 22, 1929

Inventor:
John D. Cochrane, Jr.
By Dyrenforth, Lee, Chritton & Wiles,
Attys.

Patented June 14, 1932

1,863,239

UNITED STATES PATENT OFFICE

JOHN D. COCHRANE, JR., OF CINCINNATI, OHIO, ASSIGNOR TO THE FORMICA INSULATION COMPANY, OF CINCINNATI, OHIO, A CORPORATION OF OHIO

DECORATED LAMINATED PRODUCT AND PROCESS OF MANUFACTURE

Application filed April 22, 1929. Serial No. 357,142.

This invention relates particularly to a process of producing laminated phenolic condensation products provided with a decorative surface. Laminated products are ordinarily produced by impregnating sheets of fabric, such as paper or cloth, with a solution of a potentially reactive condensation product; drying the sheets; and placing a stack of the sheets in a heated hydraulic press and consolidating the sheets under heat and pressure, the heat serving to convert the condensation product to its final infusible and substantially insoluble condition.

The phenolic condensation products ordinarily have a yellowish or straw color and sometimes a red or dark reddish color. Efforts have been made heretofore to produce decorative effects upon the surfaces of laminated phenolic condensation products, but the results have been far from satisfactory.

Hargrave Patent 1,634,830, granted July 5, 1927, describes a process of producing an imitation wood surface upon a laminated product involving the use of a phenolic condensation product.

The present invention possesses important advantages over the process described in said patent, including a decidedly improved appearance of the finished product and greater flexibility in the practice of the process. For example, the present process overcomes a certain appearance of "flatness", gives a depth to the design, which is of the utmost importance, and gives vastly greater flexibility in producing desired changes in colors, or shades. The improved process renders it possible, by carrying in stock a limited supply of opaque sheets of different colors and a limited supply of printed sheets carrying designs, to obtain a wide variety of appearances in the finished product.

In accordance with the present invention, as preferably practiced, an impregnated opaque sheet of material is placed upon a stack of ordinary impregnated sheets; and a surface sheet bearing the desired design imprinted thereon, said surface sheet being also impregnated with a phenolic condensation product, is placed upon the opaque sheet. The stack of sheets is then consolidated in a heated hydraulic press. The surface sheet is transparent, or semi-transparent, and is covered with a light film of the phenolic condensation product. The straw color of the body of sheets under the opaque sheet is largely or wholly prevented from modifying the color of the decorative surface by reason of the opacity of the sheet underlying the printed sheet. The opaque sheet may be of white color, or of any other selected color; and variation in the color of the opaque sheet results in varying the effect in the decorative design, since, in effect, a combination of colors, or a contrast of colors is secured.

The sheets constituting the main body of the laminated product may be of paper, muslin, or other fabric. The same is true of the opaque sheet. The printed surface sheet should be of a material which is transparent, or semi-transparent, after the pressing operation.

The surface sheet may, for example, be of white paper; and where it is desired to simulate the appearance of wood, the surface sheet preferably is of paper. Also, it is possible to use, as a surface sheet, a wall paper having a design or designs printed thereon in colors.

Where it is desired to obtain a surface effect simulating in a measure the appearance of cloth, the surface sheet may be a printed silk, cretonne, taffeta, or other designed cloth.

The improved process is illustrated in the accompanying drawing, in which—

Figure 2:
Figure 3:
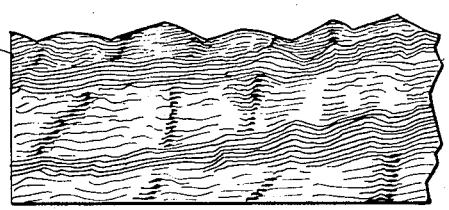

Fig. 1 is a broken perspective view of a stack of sheets ready to be placed in a heated press, the surface-sheet bearing an imitation wood grain; Fig. 2, an edge elevational view of the finished laminated product; Fig. 3, a broken plan view of the finished laminated product; and Fig. 4, a broken plan view of a finished laminated product bearing a wall paper design.

Referring to Figs. 1–3, A designates a main body of impregnated, dried sheets, these sheets having been prepared by passing a web of paper through a solution of phenolic condensation product, such as bakelite, redmanol, or the like, drying the web, and cutting it into sheets; B designates an opaque sheet, prepared, for example, by dipping a sheet of paper in a solution of bakelite having incorporated therein a suitable percentage of pigment, and, if desired, a small percentage of a dye, and then drying the sheet; and C designates a surface sheet of transparent, or semi-transparent, character having printed thereon, as by means of rolls having grained surfaces, a design imitating the grain of a wood, for example, walnut. The sheet C, after the design has been printed thereon, is dipped in a solution of clear bakelite, and dried.

Finally, the sheets, in superposed relation, are placed in a heated hydraulic press and consolidated under heat and pressure. This may be accomplished, for example, by pressing for forty-five minutes at about 175° C. under pressure of about 1100 pounds per square inch. The product is then cooled and removed from the press.

A suitable phenolic condensation product varnish for producing the opaque sheets may be made by mixing 200 pounds of any well-known phenolic condensation product varnish, such as bakelite varnish, with about 47½ pounds of titanium oxide white pigment. A small amount of dye of desired color may be introduced, if desired.

In practice, it is desirable to keep in stock opaque sheets of different colors, which may be used as background sheets upon which the sheet bearing the design is to be placed. By keeping on hand a supply of opaque sheets of different colors and a supply of printed sheets of different designs and having different colors in the designs, it is possible to produce readily, from the stock sheets, a great variety of decorative effects on laminated products.

If desired, the main body of impregnated sheets A may be first consolidated into an ordinary laminated product; and the background sheet and the surface sheet C may afterwards be applied and consolidated by means of heat and pressure.

It will be evident to those skilled in the art that varying effects in obtaining imitations of a particular kind of wood, such as walnut, may be obtained by varying the printing upon the surface sheet, and by varying the color of the background sheet. For example, a very dark colored walnut may be obtained by the use of a deep purple background sheet; or a very light colored walnut may be obtained with a light purple background sheet. Similarly, a golden oak may be obtained, or a dark colored oak may be obtained.

Referring to Figs. 2 and 3, the finished laminated product is designated D.

Figure 4:
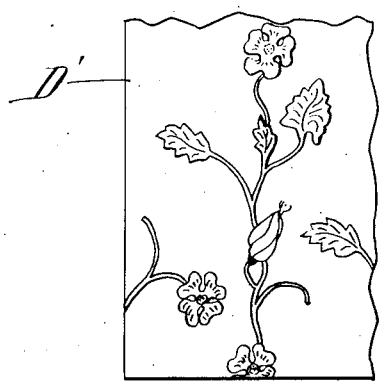

Referring to Fig. 4, D' designates a laminated product in which the surface sheet is provided with a scroll or flower design. The surface sheet in this case may be an ordinary sheet of wall paper; or it may be printed silk, or the like. The process of producing the product is the same as that described above.

The pigment employed in the bakelite varnish in producing the opaque sheet may constitute, for example, about 20% of the combined bakelite varnish and pigment and solvent. The proportions may vary, of course, but it is desirable, particularly when a light-colored pigment is employed alone, to use the pigment in the proportion of from 10 to 30%. Where a pigment of a character to readily produce opacity is employed, the percentage need not be large. In those cases where a white background is not desired, it is desirable to use a small percentage of a dye in conjunction with a desirable percentage of pigment.

Further examples of the improved process may be given, as follows:

(a) Upon a stack of paper sheets impregnated with ordinary bakelite varnish is placed a background sheet impregnated with bakelite varnish containing white pigment, or covered by an opaque film of bakelite varnish containing white pigment; a surface sheet having a suitable design printed thereon in ink, said sheet being impregnated with clear bakelite, is placed upon the opaque background sheet; and the whole stack is consolidated under heat and pressure. The opaque sheet cuts out the dark amber color beneath it and produces bright, clean colors in the design of the surface sheet. These colors are viewed, in a measure, in perspective, standing in a plane above the opaque sheet. Moreover, they are viewed through the thin film of clear bakelite.

(b) A sheet of wall paper, having a suitable design printed thereon, is impregnated with clear bakelite; a background under sheet is prepared by dipping it a number of times into a bakelite solution containing titanium oxide white pigment ground in a ball mill with the bakelite varnish and alcohol; the background sheet and the surface sheet are placed upon a stack of orinary impregnated sheets, and the whole consolidated in a heated hydraulic press.

(c) A background, or undersheet, is prepared by applying an opaque film of white pigment in bakelite as a bond to standard muslin; upon this background sheet is placed a printed sheet of silk having a suitable design and suitably impregnated with bakelite; and these sheets are placed upon a stack of ordinary impregnated muslin sheets, or paper sheets, and the whole consolidated under heat and pressure. The result is to eliminate the dark amber color of the main body of sheets, thereby giving bright, clean colors in the designed sheet.

In another modification, the undersheet was given an application of light purple pigment ground in a ball mill with bakelite and alcohol. This sheet was placed beneath a transparent sheet grained to represent walnut; and the two sheets were superimposed upon a stack of ordinary impregnated sheets of paper and consolidated in a heated press. This resulted in a laminated product having a light tan background for the walnut grain, giving an effect of depth not obtainable by known methods. In the example just given, it is to be observed, the resultant color effect is the combined effect of the purple opaque sheet, the grained transparent sheet, and the film of bakelite—all combined to give an almost perfect imitation of walnut finish.

As has been stated above, the opaque sheet may be given any desired color, so as to contrast in some cases and combine in other cases with the colors in or on the printed sheet. Thus, a given pattern of wall paper printed in colors may be used in accordance with the improved process to produce various colors in the decorative sheet of the laminated product, depending upon the color of the opaque sheet selected.

The improved process gives great flexibility in obtaining the proper color effect, more perfect contrast, when contrast is desired, coupled with the effect of depth and, generally, improved appearance.

It will be understood that the phenolic condensation product employed for impregnating the sheets is a potentially reactive phenol resin. That is, it is a condensation product which has not been carried to the final infusible insoluble condition. It should contain sufficient formaldehyde, hexamethylenetetramine, or other active methylene body, to complete the conversion of the resin to the final state during the process of consolidation explained above.

The improved product may be usefully employed in many situations. For example, it may be employed as wainscoting, wall covering, table tops, desk tops, etc. When employed as wall covering and, in many other situations, the laminated product ordinarily is about one-sixteenth of an inch in thickness. Any desired thickness may be employed, however. The laminated product may be secured to a backing of wood, if desired. This may be done by means of a suitable adhesive, or by means of mechanical securing means.

The foregoing detailed description has been given for clearness of understanding only, and no unnecessary limitations should be understood therefrom, but the appended claims should be construed as broadly as permissible, in view of the prior art.

What I regard as new, and desire to secure by Letters Patent, is:

1. In a process of manufacturing a decorated laminated phenolic condensation product, the steps which comprise: consolidating under heat and pressure a main body of sheets of fabric impregnated with phenolic condensation product, a superposed opaque sheet impregnated with phenolic condensation product, and a printed surface sheet impregnated with clear phenolic condensation product and of transparent character.

2. A process which comprises: consolidating under heat and pressure a body of separate sheets impregnated with potentially reactive phenol resin, a superposed colored opaque sheet impregnated with potentially reactive phenol resin, and a surface sheet having a design printed thereon in colors adapted to form in conjunction with the color of the opaque sheet a composite color, said surface sheet being impregnated with clear potentially reactive phenol resin.

3. In a process of producing a decorated laminated product, the steps which comprise: preparing an opaque background sheet of fabric of given color and impregnated with potentially reactive phenol resin; impregnating with potentially reactive clear phenolic condensation product a semi-transparent surface sheet bearing a printed design thereon; and drying said sheets, placing them in superposed relation, and consolidating them under heat and pressure.

4. A decorated composite laminated phenolic condensation product, comprising: a plurality of sheets of fabric impregnated with a phenolic condensation product; an opaque background sheet of fabric impregnated with a phenolic condensation product having associated therewith a pigment; and a semi-transparent surface sheet having a design printed thereon and having a clear phenolic condensation product therein—all of said sheets being consolidated together and said phenolic condensation product being in the final infusible and substantially insoluble condition.

5. In a process of manufacturing a decorated laminated phenolic condensation product, the steps which comprise: impregnating a background sheet with a potentially reactive condensation product having incorporated therein a material serving to render the sheet opaque; impregnating with a clear phenolic condensation product a surface sheet adapted to be rendered semi-transparent thereby, said surface sheet having printed thereon a design; and consolidating under heat and pressure said sheets and an underlying body comprising sheets of fabric and a phenolic condensation product.

6. In a process of manufacturing a decorated laminated phenolic condensation product, the steps which comprise: consolidating under heat and pressure a main body of sheets of fabric impregnated with phenolic condensation product, a printed surface sheet impregnated with clear phenolic condensation product and of transparent character, and an opaque layer interposed between said surface sheet and the underlying body of sheets.

JOHN D. COCHRANE, Jr.